United States Patent
Farhan

(10) Patent No.: US 6,356,374 B1
(45) Date of Patent: Mar. 12, 2002

(54) DIGITAL OPTICAL TRANSMITTER

(75) Inventor: Forrest M. Farhan, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/169,612

(22) Filed: Oct. 9, 1998

(51) Int. Cl.[7] .................. H04B 10/04; H04B 10/00; H04J 4/00; H04J 14/08
(52) U.S. Cl. .................. 359/180; 359/123; 359/135; 359/158; 359/154
(58) Field of Search .............................. 359/135, 140, 359/158, 180, 123, 113; 370/535; 348/1–13; 455/1–12

(56) References Cited

U.S. PATENT DOCUMENTS

| | | | |
|---|---|---|---|
| 3,995,120 A | | 11/1976 | Pachynski, Jr. ............... 179/15 |
| 4,759,018 A | | 7/1988 | Buchner ...................... 370/112 |
| 5,018,142 A | | 5/1991 | Simcoe et al. ............... 370/112 |
| 5,420,583 A | | 5/1995 | Knecht ........................ 341/59 |
| 5,426,527 A | * | 6/1995 | Steen et al. .................. 359/123 |
| 5,459,607 A | | 10/1995 | Fellows et al. ............. 359/138 |
| 5,544,161 A | * | 8/1996 | Bigham et al. ............ 370/58.1 |
| 5,553,064 A | * | 9/1996 | Paff et al. ..................... 370/50 |
| 5,563,815 A | | 10/1996 | Jones ........................ 364/721 |
| 5,610,911 A | * | 3/1997 | Ishikawa et al. ............ 370/503 |
| 5,631,757 A | | 5/1997 | Bodeep et al. |
| 5,644,622 A | | 7/1997 | Russell et al. |
| 5,694,232 A | * | 12/1997 | Parsay et al. ................ 359/113 |

FOREIGN PATENT DOCUMENTS

| | | |
|---|---|---|
| WO | WO 88/05233 | 7/1988 |
| WO | WO 97/28611 | 8/1997 |

* cited by examiner

Primary Examiner—Jason Chan
Assistant Examiner—M. R. Sedighian
(74) Attorney, Agent, or Firm—Hubert J. Barnhardt, III; Kenneth M. Massaroni; Shelley L. Couturier

(57) ABSTRACT

A cable television system (700) includes a clock source (710) for generating a clock signal, an optical receiver (605) coupled to the clock source (710) for recovering the information in accordance with the clock signal, and an optical transmitter (800) that has input ports (720) for receiving first and second information signals and a clock port (760) for receiving the clock signal. An interleaver (745) within the transmitter (800) is coupled to the input ports (720) and to the clock port (760). The interleaver (745) interleaves bits of the information signals in accordance with the clock signal to generate a serial bit stream that is used to modulate a laser diode (750), thereby generating a digital optical signal that is transmitted to the optical receiver (605) over an optical communication medium (110).

8 Claims, 5 Drawing Sheets

DIGITAL OPTICAL TRANSMITTER

FIELD OF THE INVENTION

This invention relates generally to fiber optic communications, and more specifically to optical transmitters for use in fiber optic communications.

BACKGROUND OF THE INVENTION

Cable television systems typically include a headend section for receiving satellite signals and demodulating the signals to baseband. The baseband signal is then converted to an optical signal for transmission from the headend section over fiber optic cable. Optical transmitters are distributed throughout the cable system for splitting and transmitting optical signals, and optical receivers are provided for receiving the optical signals and converting them to radio frequency (RF) signals that are further transmitted along branches of the system over coaxial cable rather than fiber optic cable. Taps are situated along the coaxial cable to tap off the cable signals to subscribers of the system.

Various factors influence the ability to accurately transmit and receive optical signals within a cable television system. As the length of fiber optic cable within a system increases, for example, signal losses also increase. Furthermore, temperature fluctuations, which cause variation in the optical modulation index of the optical transmitter, can result in variation of the radio frequency (RF) output level of the optical receiver. Signal distortions can be caused by nonlinearities in the laser and photodiode of the optical transmitter.

Although these problems can be mitigated by employing expensive techniques, e.g., decreasing fiber lengths between optical nodes, such techniques may prohibitively increase costs to both subscribers and service providers. Thus, what is needed is a better way to provide reliable and accurate transmission of optical signals within a cable television system.

DETAILED DESCRIPTION OF A PREFERRED EMBODIMENT

Figure 1:
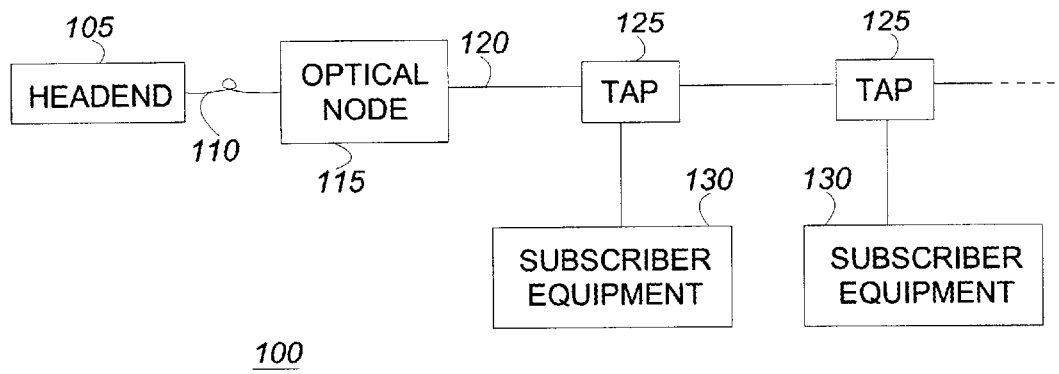
FIG. 1 is a block diagram of a cable television system in accordance with the present invention.

FIG. 1 shows a communications system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend 105 can, for instance, convert the baseband signal to an optical signal that is transmitted over fiber optic cable 110, in which case a remotely located optical node 115 converts the optical signal to an electrical radio frequency (RF) signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the RF signals to optical signals for transmission over the fiber optic cable 110 to the headend 105.

Figure 2:
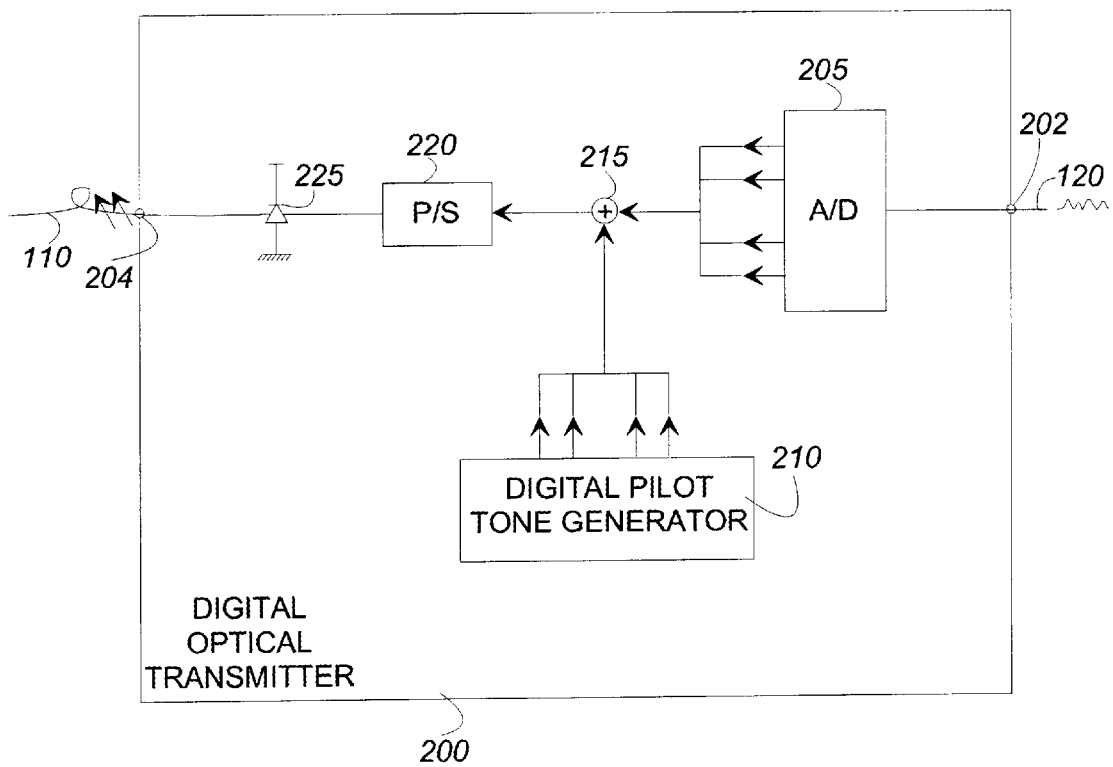
FIG. 2 is an electrical block diagram of an optical transmitter included in the cable television system of FIG. 1 in accordance with the present invention.

Referring to FIG. 2, a digital reverse transmitter 200 is provided for transmitting digital optical signals to the headend 105 in the reverse direction. The transmitter 200 can, for instance, be included within the optical node 115, although other locations within the cable television system 100 may also include the digital reverse transmitter 200 of the present invention. The transmitter 200 receives, at an input 202, an analog information signal that is representative of one or more reverse RF signals from the subscriber equipment 130. At its output 204, the transmitter 200 provides a digital optical signal that is generated in accordance with the analog information signal as well as an optional pilot tone that serves to provide a reference level during processing at the headend 105.

More specifically, the digital reverse transmitter 200 includes an analog-to-digital (A/D) converter 205 for converting the analog input to a digital signal, i.e., a digital word comprising a particular number of bits, in a conventional manner. The resolution of the A/D converter 205, of course, is dependent upon transmitter design parameters. The transmitter 200 can also include a digital pilot tone generator 210 for providing a digital pilot tone in the form of a number of bits representative of a particular level and frequency. The digital pilot tone generator 210 could, for instance, include input switches by which the level and frequency could be varied. U.S. Pat. No. 5,563,815 to Jones, the teachings of which are hereby incorporated by reference, shows a digital tone oscillator that could be used to implement the generator 210 included in the transmitter 200 of the present invention.

A summer 215 receives the digital information signal from the A/D converter 205 and the digital pilot tone signal from the generator 210 and digitally adds the two signals by performing binary addition in a known manner. The summed signal is then coupled to a parallel-to-serial (P/S) converter, or a serializer 220, which receives the parallel inputs representative of the summed signal and converts the inputs into a serial bit stream. A laser diode 225 is then driven to generate an optical signal in accordance with the serial bit stream. It will be appreciated that the serializer 220 can also include a driver for driving the laser diode 225 and frame encoding circuitry for encoding the serialized digital signal into frames of data.

Figure 3:
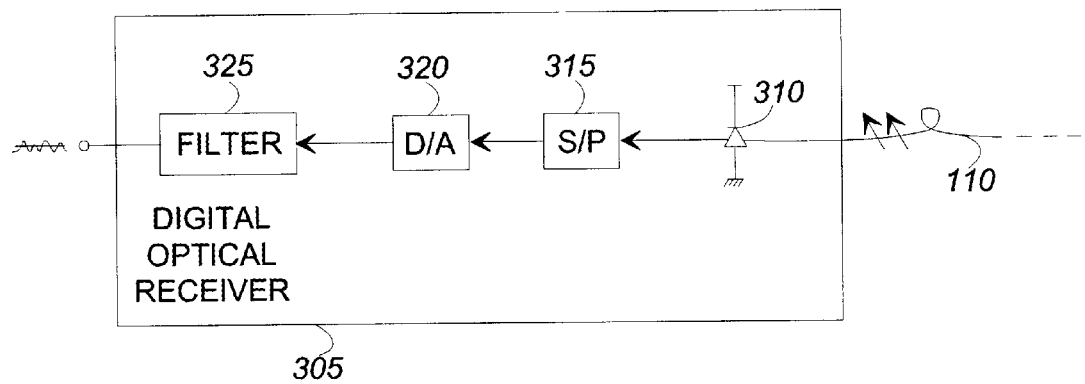
FIG. 3 is an electrical block diagram of an optical receiver included in the cable television system of FIG. 1 in accordance with the present invention.

FIG. 3 is a block diagram of an optical receiver 305 for receiving the digital optical signal transmitted by the optical transmitter 200. The receiver 305 can be, for instance, located in the headend 105, although other locations, such as any intervening nodes, may also employ the receiver 305. The receiver 305 includes a detector, such as a photodiode 310, for receiving the digital optical signal transmitted over the fiber optic cable 110 and generating therefrom a serial stream of electrical pulses in accordance with the optical signal. The output signals provided by the photodiode 310 are coupled to a serial-to-parallel (P/S) converter 315 for generating therefrom a set of parallel outputs corresponding to a digital word. The receiver 305 further includes a digital-to-analog (D/A) converter 320 for converting the signal provided at its digital input to an analog signal in a known manner. Thereafter, the analog signal is processed by a filter 325 to separate the pilot tone signal from the information signal. More specifically, the filter 325 preferably comprises a low pass filter that only passes the fundamental frequency component of the output of the D/A converter 320. As a result, the digital optical receiver 305 is able to provide at its output a reference signal, i.e., the pilot tone, and an analog signal that approximates the analog information signal initially provided to the optical transmitter 200. Furthermore, this can be done without encountering many of the problems that arise in prior art designs.

In conventional cable television systems, optical links in the reverse path use amplitude modulation to directly modulate a laser generating a reverse optical signal. As a result, RF output level of the optical receiver is directly dependent upon the optical modulation index (OMI), which in turn is directly related to the RF drive current, the laser threshold current, and the laser bias current of the laser located in the transmitter. Since the laser bias and threshold currents vary with temperature, which in turn causes temperature variations of the OMI, the RF output level of the optical receiver also varies with temperature. However, the laser within the transmitter 200 of the present invention is digitally modulated so that the RF level information is encoded according to a bit stream; as a result, variations in the OMI, the laser bias current, the laser threshold current, and the temperature do not affect RF output levels of the optical receiver 305.

Prior art optical transmission that uses AM modulation also result in a system in which the linearity of the received optical signal is directly dependent upon the linearity of the transmitting laser and the receiving photodiode. Therefore, non-linearities of those devices can greatly degrade the performance of the reverse path system. Additionally, the non-linear conversion processes of lasers and photodiodes in conventional systems vary with temperature, thus further degrading the performance. Conversely, the digital optical system, i.e., the digital optical transmitter 200 and the digital optical receiver 305, of the present invention only generates and resolves two amplitude levels rather than a continuum of levels. As a result, linearity requirements of the laser and photodiode are reduced, which results in better performance and less expense.

Another problem associated with conventional cable television systems is that reverse pilot tones are seldom used due to the complications and costs. When such pilot tones are used, an additional oscillator, which is not digital, is generally located outside the transmitter and is susceptible to temperature variations. The oscillator signal is combined with the analog RF signal, and the combined signal is used to modulate the laser diode current to provide an optical output. Prior art pilot tones are used by an optical transmitter to ensure that there is always a minimum RF signal modulating the laser, thereby decreasing the spurious noise generated by the laser, and by an optical receiver for gain control purposes. However, since oscillator output level drifts with temperature, the RF output level of the optical receiver will also drift with temperature so that gain control is essentially useless. As mentioned above, use of the combined digital pilot tone and digital information signal according to the present invention solves the prior art temperature dependency problems. At the same time, the digital pilot tone can be used by the transmitter 200 to modulate the laser even when no RF input is present.

Still another advantage of the digital optical transmitter 200 and receiver 305 of the present invention is that the cable system 100 can, without significant cost or performance penalties, employ an architecture in which fiber stretches deeper into the system 100. As a cable television signal travels along a fiber optic cable 110, the signal decreases in power as a result of laser noise, Rayleigh backscattering, photodiode shot noise, receiver amplifier noise, unmodulated Fabry-Perot sporadic noise, and post amplifier intrinsic noise. These factors cause the carrier-to-noise ratio (CNR) to decrease. Conventionally, this problem is mitigated by driving the transmitter laser with more power and/or increasing the receive sensitivity of the receiver photodiode at great expense. However, this need not be done in a system 100 according to the present invention since the noise sources and corresponding signal degradation resulting from increased fiber lengths does not affect recovery of information to the same extent as in prior art systems.

Figure 4:
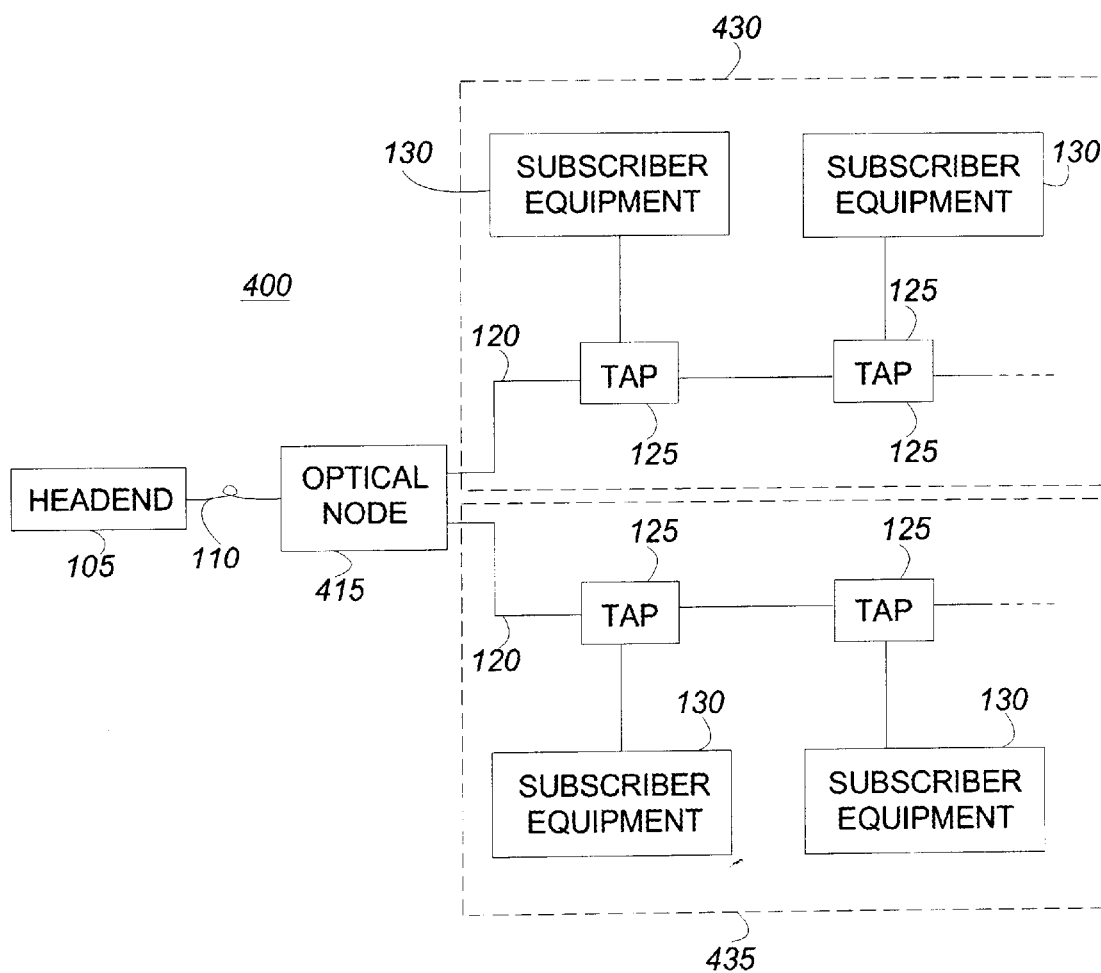
FIG. 4 is a block diagram of a cable television having multiple outputs to subscriber regions in accordance with the present invention.

Referring next to FIG. 4, a modified cable television system 400 is depicted. The system 400 includes a headend 105 for generating cable television signals that are split off to subscriber equipment 130 by taps 125. However, in the system 400, the optical node 415 splits off the downstream cable signal for transmission to multiple distribution systems 430, 435, or branches. Each branch typically provides service to subscribers located in different geographic regions. Upstream reverse signals provided by subscriber equipment 130 in the different branches 430, 435 is transmitted in the form of analog RF signals to the optical node 415, which combines the signals for further upstream transmission in the form of an optical signal. According to the present invention, the upstream signals from the different branches 430, 435 can be converted to a digital optical signal in a manner that minimizes or eliminates many of the problems associated with prior art cable television systems.

Figure 5:
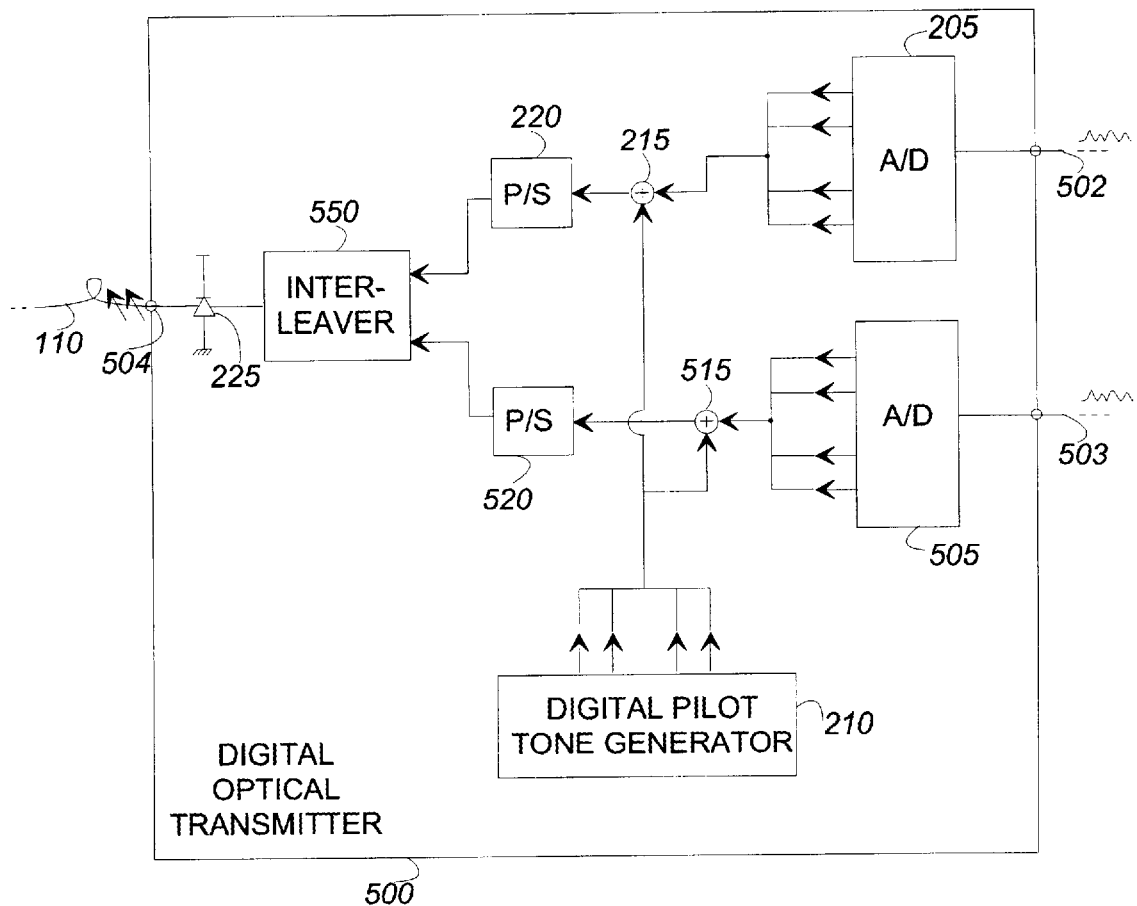
FIG. 5 is an electrical block diagram of an optical transmitter included in the cable television system of FIG. 4 in accordance with the present invention.

FIG. 5 is an electrical block diagram of an optical transmitter 500 that can, in accordance with the present invention, be used to process multiple analog inputs. At input 502, the transmitter 500 receives a first analog input, such as from a first branch 430 of a cable television system 400, and, at input 503, the transmitter 500 receives a second analog input, such as from a second branch 435 of the system 400. First and second A/D converters 205, 505 respectively convert the received RF signals to digital information signals that are separately summed, by summers 215, 515, with the digital pilot tone. Each summed signal is then serialized by serializers 220, 520 to result in first and second serial bit streams that are representative of the first and second RF signals, respectively, as separately combined with the digital pilot tone. According to the present invention, bits of the serial bit streams are interleaved by an interleaver 550 to form a single digital signal that modulates the laser diode 225. As a result, a single digital optical signal can be provided at the output 504 of the transmitter 500.

Figure 6:
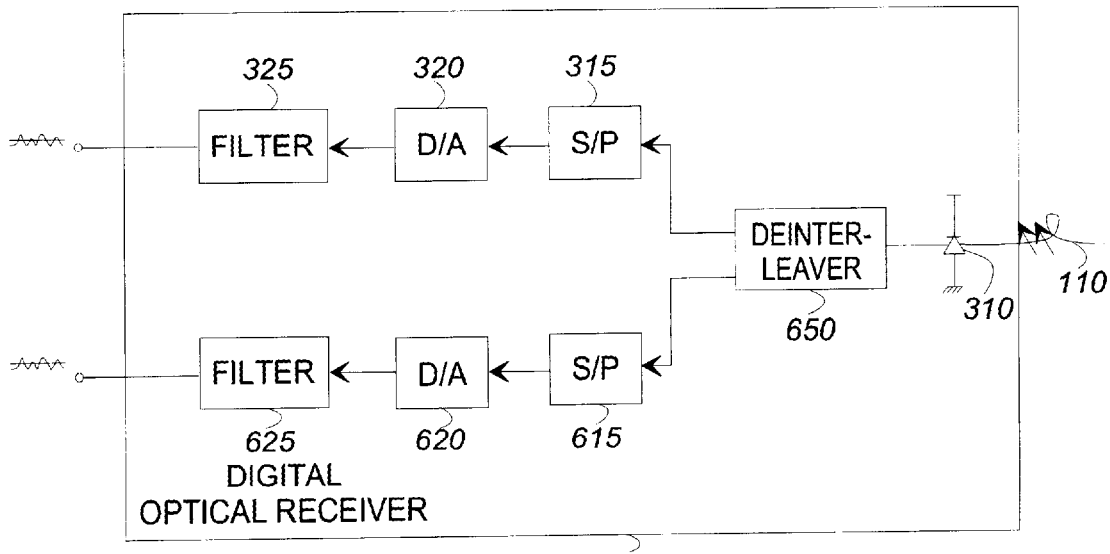
FIG. 6 is an electrical block diagram of an optical receiver included in the cable television system of FIG. 4 in accordance with the present invention.

Referring to FIG. 6, an optical receiver 605 for processing the digital optical signal generated by the transmitter 500 is shown. The receiver 605 includes a photodiode 310 for generating electrical pulses from the optical signal and a deinterleaver 650 for deinterleaving the signal comprising the electrical pulses. Once the deinterleaver 650 has separated the received signal into separate serial bit streams, the outputs are coupled to first and second S/P converters 315, 615, first and second D/A converters 320, 620, and first and second filters 325, 625 to recover approximations of the pilot tone and the RF signals that were provided to the transmitter 500.

It will be appreciated that the interleaver 550 and the deinterleaver 650 can be implemented using conventional components. Typically, the interleaver 550 could be a framing device capable of implementing a time-domain-multiplexing (TDM) scheme with respect to the incoming bit streams. In such an implementation, a frame clock (not shown) would be coupled to the interleaver 550, and one frame would consist of a number of sub-frames equivalent to the number of incoming bit streams. A flag bit would likely be inserted into the frame for identifying the start of the frame. The deinterleaver 650 is capable of extracting the frame clock signal from the incoming information and recognizing the flag bits indicative of frame starts. Each bit would then be routed to its respective bit stream to recover the original signals.

Although only two input branches into the transmitter 500 and two processing paths through the transmitter 500 and the receiver 605 are shown, a plurality of paths can be provided depending upon the number of incoming analog signals to be processed by the transmitter 500. For example, if five RF signals are traveling in the reverse paths of five branches of a cable television system, the optical transmission system according to the present invention would individually convert each reverse signal to a digital signal, add it to the pilot tone, and serialize the combined signal. All serialized signals would then be combined by the interleaver 550 to generate a bit stream for modulating the laser diode 225 (FIG. 5). On the receiver end, the deinterleaver 650 would deinterleave the received digital optical signal to provide five serial signals that would be individually processed by S/P converters, D/A converters, and filters to provide five analog outputs as well as an approximation of the pilot tone.

In this manner, reverse signals of the same frequency can be conveniently sent to the headend 105 over the same return fiber 110. This is very important since cable television systems typically only allocate a small amount of bandwidth, e.g., 5–40 MHZ, for return path transmissions, which means that varying the frequency of each return path signal would not be practical.

Figure 7:
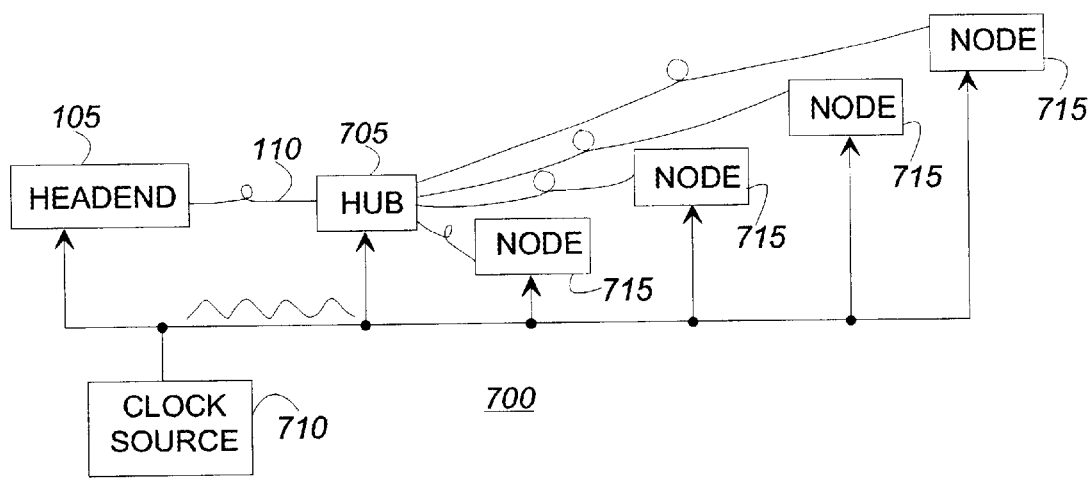
FIG. 7 is a block diagram of a cable television system including a clock source in accordance with the present invention.

Referring next to FIG. 7, a block diagram illustrates a cable television system 700 in which digital optical transmission and reception is clocked by a clock signal provided by a source 710 that preferably generates a sinusoidal signal of a particular frequency. The clock source 710 can be external, i.e., from outside the system 700, or internal to the cable television system 700. For example, the clock source 710 could be located in the headend 105 and coupled to nodes 715 for transmitting digital reverse optical signals and to any optical hub 705 for combining transmissions from the nodes 715 over a single fiber 110.

When a cable television system, such as the system 700, is large enough to include a hub 705 and multiple branches, each including its own optical node 715, internal clock sources for each node could result in slight variations in the clock signals. If the clock signals were not synchronized precisely at the nodes 715, combining of the received signals at the hub 705 could cause erroneous reception of data at the headend 105. The use of the same clock signal for the hub 705 and nodes 715, on the other hand, ensures that data streams received by the hub 705 and retransmitted to the headend 105 are synchronized in time for accurate data transmission and reception.

Figure 8:
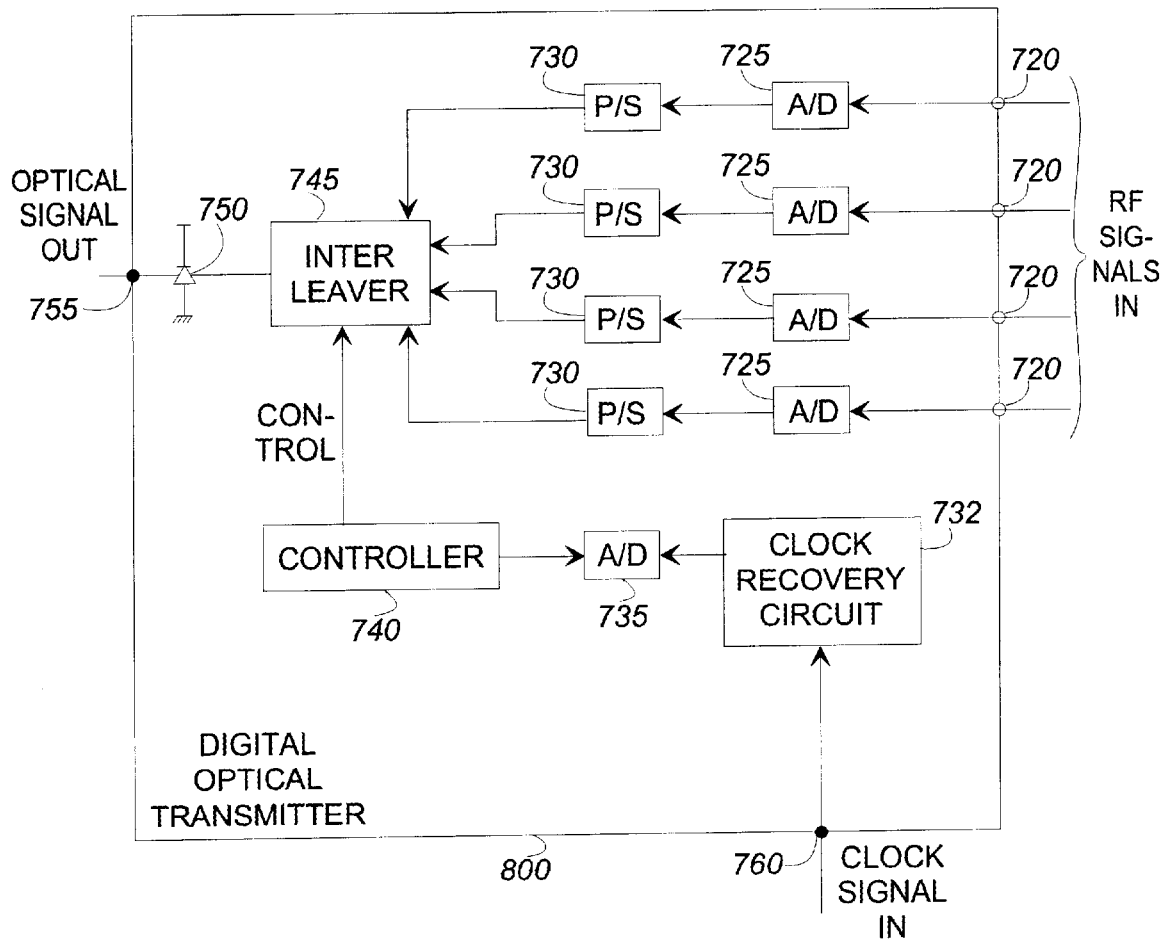
FIG. 8 is an electrical block diagram of an optical transmitter for receiving a clock signal from the clock source of FIG. 7 in accordance with the present invention.

FIG. 8 illustrates an embodiment of a digital optical transmitter 800 in which an external clock signal is provided. The digital optical transmitter 800 could reside in an optical node 715, as shown, or in the optical hub 705, as will be explained in greater detail below. Although the transmitter 800 is shown in FIG. 8 as receiving only four reverse electrical signals via input ports 720, the transmitter 800 can receive any number of reverse signals. Each input port 720 is coupled to a reverse path that includes an A/D converter 725 for converting the analog electrical signal to a digital electrical signal and a serializer 730 for converting the digital signal to a serial bit stream. Each serial bit stream within the transmitter 800 is provided to an interleaver 745 for interleaving the bits of data to generate a single bit stream that modulates the laser diode 750, which provides a single digital optical signal at output port 755.

According to this embodiment of the present invention, the bit stream generated by the interleaver 745 is clocked by an external clock signal, rather than by an internally generated clock signal. The external clock signal is received at clock port 760 and provided to a clock recovery circuit 732 which can comprise, for example, a bandpass filter. The output of the clock recovery circuit 732 is coupled to an A/D converter 735 for digitizing the clock signal and then to a controller 740, which controls the interleaver 745. More specifically, the controller 740 clocks the interleaver 745 at the clock speed or some multiple thereof and controls the interleaver 745 for transmission of frames of data. So that transmission speed is not compromised by the time-division-multiplexing of multiple reverse signals, the speed of the interleaved signal is preferably n times the speed of each reverse signal, where n is equal to the number of reverse signals received and interleaved by the digital optical transmitter 800.

Figure 9:
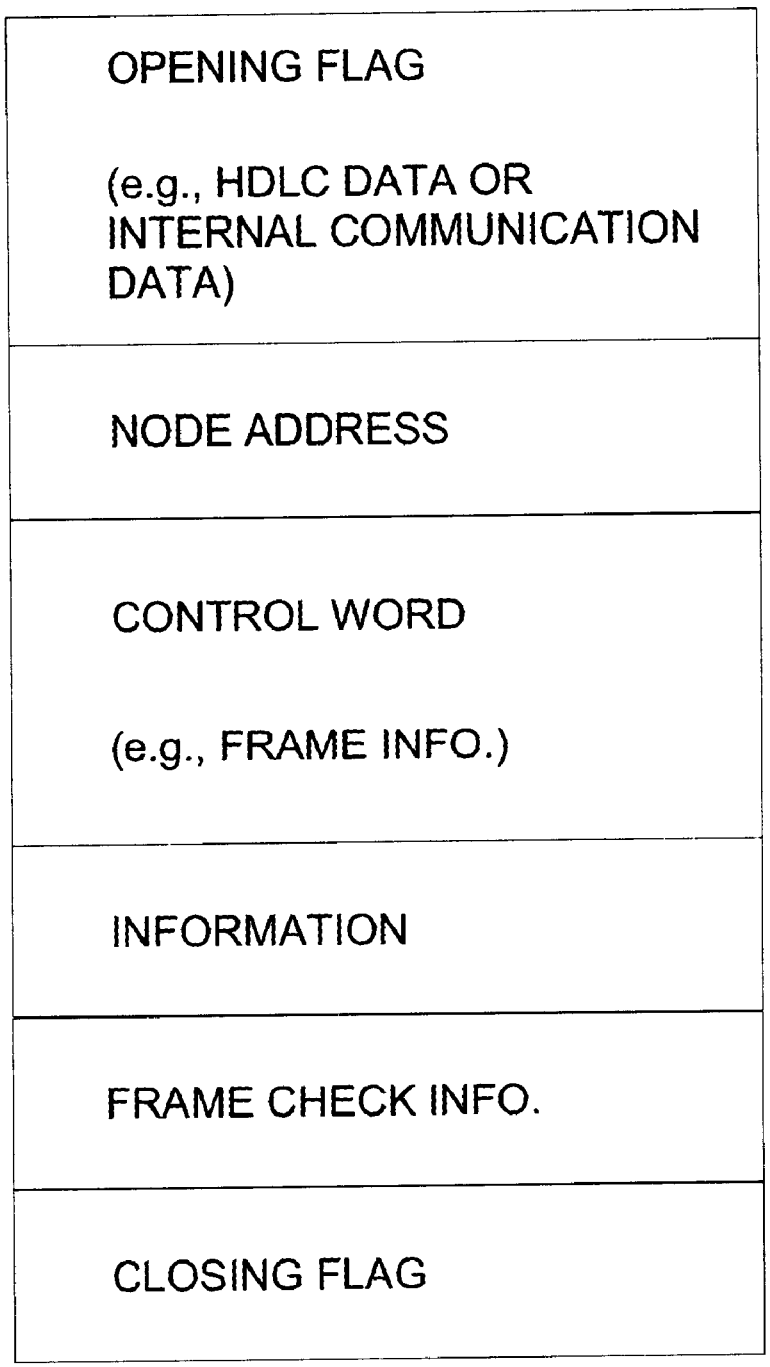
FIG. 9 is an illustration of a frame structure for frames of information that can be transmitted by the optical transmitter of FIG. 8 in accordance with the present invention.

FIG. 9 is an illustration of a frame 900 of data that can be transmitted by the digital optical transmitter 800. Preferably, the frame 900 comprises an opening flag that indicates the start of the frame by including internal communication data, such as a high-level data link control (HDLC) word. The opening flag is followed by an address indicative of the transmitting device, e.g., a node 715, from which a particular reverse signal originates. The frame 900 further comprises a control word, or framing information, that indicates other frame characteristics, such as the length, in bits or words, of the information that follows the control word. Frame check information, such as a cyclical redundancy code (CRC) or other error detection/correction information, may also be included in the frame 900, and the frame 900 concludes with transmission of a closing flag, which is known to both transmitter 800 and receiver.

It will be appreciated that the frame 900 may be different depending upon the signal protocol that is used to transmit the reverse optical signal. When the HDLC protocol is used, for example, the least significant bit (LSB) of a periodically occurring word of digital information is used to insert a signaling bit into the data stream. More specifically, the LSB of every eighth ($8^{th}$) word is used to insert either a bit of the HDLC word or a bit of the framing information, in an alternating pattern. However, this procedure may vary or be eliminated altogether for other signal protocols.

As mentioned above, FIG. 8 is an illustration of a digital optical transmitter 800 included in an optical node 715. One of ordinary skill in the art will understand that a transmitter 800 included in the hub 705 is similar, but the A/D converters 725 and serializers 730 would be replaced with optical detectors, such as detector 310 (FIG. 6), for generating a digital electrical signals that could be provided directly to the interleaver 745.

It will further be understood that, when a single optical signal is received, such as by the headend 105, the transmitting device (e.g., the hub 705) and the receiving device (e.g., the headend 105) need not necessarily receive the same external clock signal. Instead, since there is no interleaving of received signal with which to contend, the transmitting device could mix a digital pilot tone with the information signal, as described in FIG. 2. Alternatively, synchronization information could be transmitted by the transmitting device and a bit synchronizer employed by the receiving device so that the same clock signal does not need to be used and so that a pilot tone does not have to be transmitted. However, as mentioned above, use of a synchronizing clock signal is desirable for situations in which a device (e.g., the hub 705) receives multiple signals that must be interleaved for retransmission as a single signal.

In summary, the reverse digital transmission system described above provides one or more reverse signals without many of the problems present in prior art systems. As a result, information can be sent from subscribers to the headend in a more reliable and less expensive manner.

What is claimed is:

1. A communication system for providing information, the communication system comprising:
   a clock source for generating a clock signal having a clock speed;
   an optical receiver coupled to the clock source for recovering the information in accordance with the clock signal;
   an optical transmitter coupled to the clock source and the optical receiver, the optical transmitter comprising:
      first and second input ports for receiving first and second information signals:
      a clock port coupled to the clock source for receiving the clock signal;
      a clock recovery circuit for filtering the clock signal provided at the clock port;
      an analog-to-digital (A/D) converter coupled to the clock recovery circuit for digitizing the clock signal;
      an interleaver coupled to the first and second input ports and to the clock port, wherein the interleaver interleaves bits of the first and second information signals in accordance with the clock signal, after it has been digitized, to generate a serial bit stream;
      a controller coupled to the A/D converter and the interleaver for clocking the interleaver at a multiple of the clock speed; and
      a laser diode coupled to the interleaver and modulated by the serial bit stream to generate a digital optical signal; and
      an optical communication channel coupled between the laser diode of the optical transmitter and the optical receiver.

2. The communication system of claim 1, wherein the first information signal and the second information signal are provided to the optical transmitter at a first speed, and wherein the digital optical signal provided by the laser diode is transmitted at a second speed that is a multiple of the first speed.

3. The communication system of claim 1, wherein the communication system comprises a cable television system.

4. The communication system of claim 1, wherein:
   the communication system comprises a cable television system including a headend for transmitting forward optical signals in a forward direction, an optical hub for forwarding the forward optical signals over branches of the cable television system, and optical nodes located in branches of the cable television system for converting the forward optical signals to forward electrical signals.

5. The communication system of claim 1, wherein the controller controls the interleaver to generate frames of data according to a signal protocol.

6. The communication system of claim 1, wherein the clock source is included in the headend, from which the clock signal is provided to the optical hub and to the optical nodes.

7. A cable television system for transmitting forward and reverse signals, the cable television system comprising:
   a headend for generating forward optical signals and for receiving reverse optical signals, the headend including a clock source for generating a clock signal, having a clock speed;
   an optical hub coupled to the headend for receiving the clock signal and for forwarding the forward optical signals throughout the cable television system, the optical hub including a reverse optical transmitter comprising:
      first and second input ports for receiving first and second information signals;
      first and second analog-to-digital (A/D) converters for respectively receiving the first and second information signals and generating therefrom first and second digital information signals;
      first and second serializers coupled respectively to the first and second A/D converters for converting the first and second digital information signals into first and second serial bit streams;
      a clock port for receiving the clock signal;
      a clock recovery circuit for filtering the clock signal provided at the clock port;
      a clock A/D converter coupled to the clock recovery circuit for digitizing the clock signal;
      an interleaver coupled to the first and second serializers and to the clock A/D converter,
      a controller coupled to the clock A/D converter and the interleaver for clocking the interleaver at a multiple of the clock speed,
      wherein the interleaver interleaves bits of the first and second serial bit streams in accordance with the clock signal to generate a serial bit stream; and
      a laser diode coupled to the interleaver and modulated by the serial bit stream to generate a digital optical signal for transmission to the headend; and
   an optical communication channel coupled between the optical hub and the headend.

8. The cable television system of claim 7, wherein the controller controls the interleaver to generate frames of data according to a signal protocol.

\* \* \* \* \*